Nov. 24, 1959    J. R. CARTLIDGE ET AL    2,913,917
FASTENING MEANS FOR CUTTER CHAIN PINTLES
Filed Jan. 10, 1958
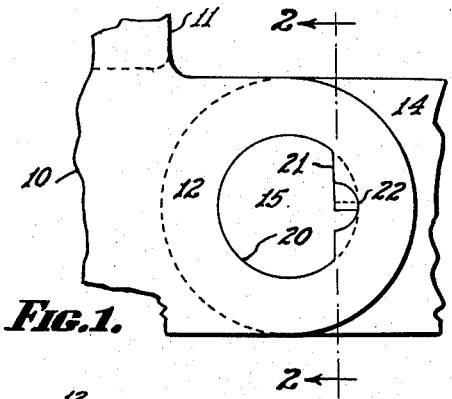
FIG.1.
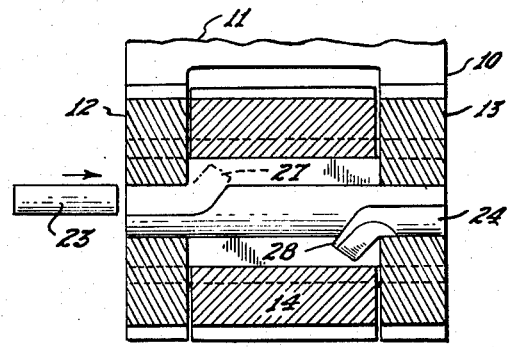
FIG.2.
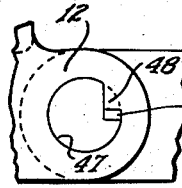
FIG.9.
FIG.3.
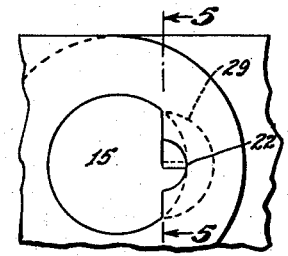
FIG.4.
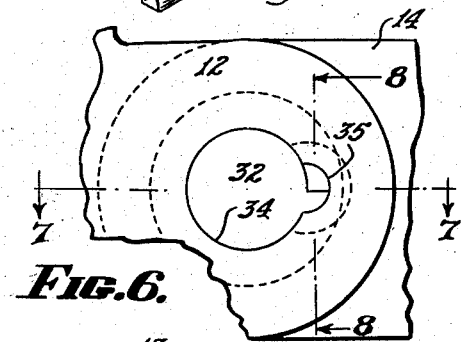
FIG.5.
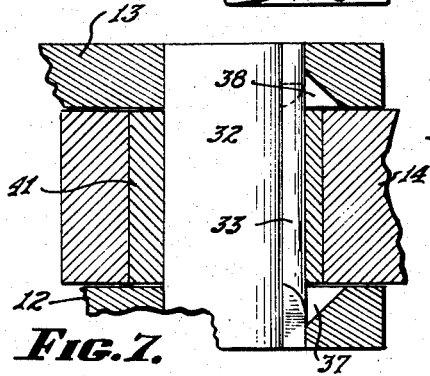
FIG.6.
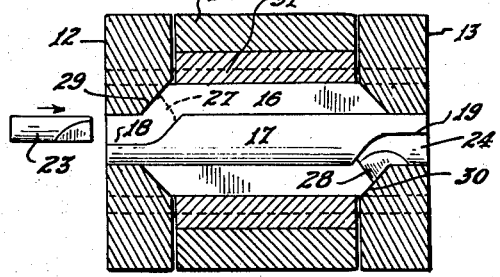
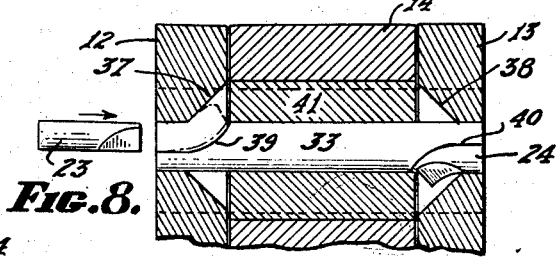
FIG.8.
FIG.7.
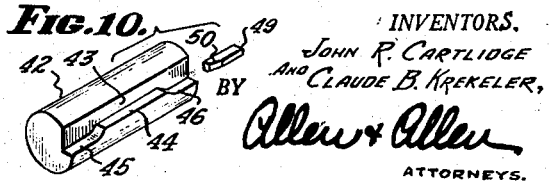
FIG.10.
INVENTORS.
JOHN R. CARTLIDGE
AND CLAUDE B. KREKELER,
BY Allen + Allen
ATTORNEYS.

United States Patent Office 2,913,917
Patented Nov. 24, 1959

2,913,917
FASTENING MEANS FOR CUTTER CHAIN PINTLES

John R. Cartlidge and Claude B. Krekeler, Cincinnati, Ohio, assignors to The Cincinnati Mine Machinery Co., Cincinnati, Ohio, a corporation of Ohio Application January 10, 1958, Serial No. 708,185

10 Claims. (Cl. 74—254)

In a copending application, Serial No. 569,461, filed March 5, 1956, and entitled "Pintle Fastening Means for Cutter Chains," now Patent 2,826,085, the inventors herein have described a structure characterized by the use of a pintle of generally cylindrical form, but having a flat on one side, with a rib located centrally of the flat. This pintle is used in a mining machine chain which may take various forms, but which is made up of link members pivoted together by the pintles referred to, the chain having at the pivot points a cheek or connector member which is located between spaced cheeks. The outer cheeks at such pivot points are provided with perforations to receive the pintle, the perforations having a flat corresponding to the pintle flat, and a groove on the flat capable of passing the rib. The inner cheek member has a circular perforation of a size to receive the pintle.

In the structure of the said copending application, the rib terminates short of the ends of the pintle, so that a locking pin member may be driven in through the groove aforesaid. The foreshortened end of the rib is shaped so as to deflect the inner end of the pin to bring it behind some portion of the outer cheek for locking purposes, i.e. to prevent longitudinal displacement of the pintle with respect to the cheek.

This structure has given excellent service. It is easy to install; and when it becomes necessary to remove a pintle, the pintle may simply be driven longitudinally out of position since the deflected pin end will shear off under these circumstances. The pintle may be locked at both ends by means of pins, or the pintle may be so configured at one end as to provide an abutment preventing longitudinal movement in one direction, a pin being used to prevent longitudinal movement in the other direction.

Mining machine chains are subjected to very heavy stresses in use, and pintle breakage is not uncommon. A fundamental object of the present invention is the provision of a structure which, while it retains all of the benefits of the structure described above, is stronger and less subject to breakage.

Another object of the invention is the provision of a structure in which the rib aforesaid may be carried out to the end of the pintle with a resultant increase of strength.

Another object is the provision of a structure in which a lesser quantity of the pintle need be cut away in order to attain the benefits of the invention.

It is a further object of the invention to provide a structure which may be inexpensively made and which will be positive in action.

These and other objects of the invention which will be apparent to one skilled in the art upon reading these specifications are accomplished by that structure and arrangement of parts of which certain exemplary embodiments will now be described. Reference is made to the accompanying drawings wherein:

Figure 1 is a partial elevational view of a pair of chain link elements in assembly together with a pintle, the pintle being locked by pins.

Figure 2 is a sectional view taken along the section line 2—2 of Figure 1.

Figure 3 is an exploded view showing the pintle of Figures 1 and 2 in perspective together with a pair of locking pins.

Figure 4 is a partial elevational views of a modified assembly.

Figure 5 is a sectional view taken along the section line 5—5 of Figure 4.

Figure 6 is a partial side elevational view of chain link members in assembly showing yet another form of pintle construction.

Figure 7 is a horizontal sectional view taken along the section line 7—7 of Figure 6.

Figure 8 is a partial vertical sectional view taken along the section line 8—8 of Figure 6.

Figure 9 is a partial side elevation of chain link members in assembly showing another form of pintle construction.

Figure 10 is an exploded view showing the pintle employed in Figure 9 in perspective, together with a locking pin.

Referring first to Figures 1, 2 and 3, there is shown a pivotal joint for a mining machine chain which comprises alternate link members of different forms. A so called socket or block link member is indicated at 10, having a socket member partially indicated at 11, and spaced link cheeks 12 and 13. Chain link members of this form are joined by single cheeked connector members 14. Those skilled in the art will understand that the socket member 11 is perforated for the reception of the shank of a cutter bit or cutter bit holder. Furthermore, there are other types of mining machine cutter chains to which the present invention will apply, as will also be understood by those skilled in the art in the light of the teachings hereinafter set forth. Thus, in one form of chain, the socket or block 11 can be attached to a single cheek element such as illustrated at 14, chain link members of this type being interconnected by a pair of connectors one lying on either side of the single cheek. In yet another form of chain, there is but one type of chain link element. This element has a block or socket member, but is provided at one end with a pair of spaced cheeks, and at the other end with a single cheek.

The chain link elements are hinged together by pintles, one of which is shown at 15.

A preferred form of the pintle of this invention is illustrated in Figure 3. It has a cylindrical body, with a flat 16 milled or broached longitudinally upon one side of it, there being an upstanding rib 17 located substantially centrally of the flat, and having a width less than that of the flat. While this rib is shown in Figure 3 as semi-circular in cross section, it may have other conformations. Since the easiest and least expensive way of manufacturing the pintles is to cut appropriate circular stock to the required lengths, and then grind or otherwise dress the individual pintles, after which the flat and the rib are formed thereon, the rib 17 will not normally extend beyond the original circular contour of the stock from which the pintle was made.

It will be noted in Figure 3 that the rib 17 extends for the full length of the pintle; but at its ends it is laterally reduced as at 18 and 19, the reduced portions tapering out to the edges of the rib at their inner ends, as shown. The outer cheeks of the chain link elements, e.g. the cheeks 12 and 13 are provided with perforations for accepting the pintle. As shown in Figure 1, the perforation 20 is provided with a flat 21 corresponding to the flat of the pintle, and a groove of a shape and size to pass the rib 17. Thus, when the ends of the pintle are engaged in the outer cheeks 12 and 13, the pintle will be non-rotatable with respect thereto. The single cheek connector member 14 is provided with a circular perforation through which the pintle can pass. The pintle will therefore be rotatable with respect to the connector. In the type of mining machine chain shown, this construction is desirable because it concentrates the wear on the connector member, which is less expensive than the other chain element, and therefore more cheaply renewed.

The relieving of the end portions of the rib 17 as at 18 and 19, provides a space within the groove 22 of the perforation of the outer cheek members through which a locking pin can be driven. A pair of such pins is shown in Figure 3 at 23 and 24. These pins may take various shapes. In the particular illustrated embodiment, they are quarter-round in cross section; and the inner ends thereof may be tapered as indicated at 25 and 26. It will be clear from Figure 2 that when the locking pins are driven inwardly through the spaces in the outer cheeks described above, the inner ends of the pins will be deflected by the tapering portions of the reliefs 18 and 19, so that the inner pin ends will move laterally. In the particular embodiment the deflected pin ends, indicated in the figure at 27 and 28, will lie within the space between the rib 17 and the circular contour of the perforation in the connector member 14, and, lying behind some portion of the outer cheeks 12 or 13, will prevent endwise movement or withdrawal of the pintle. However, the pintle may be easily removed when desired by a simple driving operation, the deflected ends of the pins shearing off.

It will be seen from Figures 1, 2 and 3 that the rib 17 extends out to the end of the pintle, preferably at both pintle ends, and therefore reinforces it. The depth of the reliefs 18 and 19 may be varied depending upon the thickness of the pin desired for locking purposes. In operation, while the pintles are subjected to very great transverse stresses, the forces tending to produce longitudinal movement are not large, and relatively small pins may be employed.

In Figures 4 and 5 a modified construction is indicated. Here like parts have been given like index numerals. The essential difference lies in this, that the outer cheek elements 12 and 13 have, adjacent the groove 22 in their perforations, been countersunk or relieved as at 29 and 30 from their inside faces. The reliefs 18 and 19 on the rib 17 are of lesser length, making for a greater rib strength; and the deflected ends 27 and 28 of the locking pins in this instance can lie wholly or partially within the countersinks, as shown. When the deflected ends of the locking pins lie within the countersinks, it becomes possible to employ a sleeve member 31 within the perforation of the connector 14, a construction which is preferred in some types of chain. The sleeve may have a perforation characterized by a flat and a groove (similar to the perforation 20 in the outer cheek members) so that the sleeve becomes non-rotatable with respect to the pintle; and if the sleeve is made of a softer material than the connector member, the wear may be concentrated upon it. Thus, the sleeves may be renewed from time to time instead of the connector members.

In Figures 6, 7 and 8, where again like index numerals have been employed to indicate like parts, a type of pintle is employed which has a full cylindrical body 32 with an upstanding rib 33 extending longitudinally of it. The perforations in the outer cheek members 12 and 13 will in this instance be full-round perforations 34 having a groove 35 at one side to pass the rib. The inner faces of the outer cheek members may be countersunk or relieved around these grooves as indicated at 37 and 38. End portions of the rib 33 are relieved as at 39 and 40; and locking pins 23 and 24 may be used as described above, the deflected ends of these pins lying within the countersinks, as shown in Figure 8. A sleeve 41 is employed within the connector.

An advantage of the type of pintle shown in Figures 6, 7 and 8 is that it has the full strength of a completely cylindrical pintle of the given diameter, plus the added strength contributed by a rib 33. However, this pintle is more difficult and expensive to manufacture than the type of pintle shown in Figure 3.

While in the figures thus far described, the reliefs 18 and 19 or 39 and 40 have been shown as made at opposite sides of the ribs 17 or 33, this is not necessary; and the reliefs can be made at the same side of the rib if desired. This permits the manufacture of a pintle which will have greater strength than the pintle of Figure 3, since less of the cyllindrical body of the pintle has been cut away during the process of its manufacture. Thus, in Figure 10 there is shown a pintle 42 having a generally cylindrical body. A V-shaped or angular groove has been milled or broached lengthwise of this pintle, giving a partial flat 43 and an upstanding shoulder 44. End portions of this shoulder have been relieved as indicated at 45 and 46. As shown in Figure 9 the outer cheek members of the chain construction are provided with perforations 47 of generally circular contour, but characterized by an inward projection 48 responding to the shape of the angular groove in the pintle. Thus, the pintle is locked against rotation with respect to the outer cheek members. At the same time, the reliefs 45 and 46 permit the use of locking pins 49. These pins will be of generally rectangular cross section. They may be tapered at their inner ends as shown at 50 in Figure 10. The inner ends of these locking pins may be deflected either into the space left within the single cheek connector member 14 by the angular groove in the pintle, or into undercuts in the inner faces of the outer cheeks, as will now be readily understood.

Modifications may be made in the invention without departing from the spirit of it. The invention having been described in certain exemplary embodiments, what is claimed as new and desired to be secured by Letters Patent is:

1. In a structure of the class described, a chain element having spaced cheeks, a second chain element having a portion to be positioned between said spaced cheeks, said cheeks and said second chain element having alignable perforations to accept a pintle, a generally cylindrical pintle for pivoting said elements together, said pintle having a longitudinally extending rib terminating at at least one end of said pintle, the perforation in at least one of said cheeks shaped to conform to the body of said pintle and said rib, said rib being relieved laterally at at least its aforesaid end to provide a space into which a locking pin may be driven through said cheek, the inner end of said relief being configured to deflect the end of said pin to a position behind a portion of said cheek.

2. The structure claimed in claim 1 in which said cheek is countersunk on its inner surface to receive the deflected end of said pin.

3. The structure claimed in claim 2 in which a sleeve surrounds said pintle and rib within the perforation in said second chain element.

4. The structure claimed in claim 1 in which said rib is located on a flat on said pintle.

5. The structure claimed in claim 4 in which the end of said pin is deflected into the space between said flat and the perforation in said second chain element.

6. The structure claimed in claim 4 wherein said cheek is countersunk on its inner surface to receive the deflected end of said pin.

7. In a structure of the class described, a chain element having spaced cheeks, a second chain element having a portion to be positioned between said spaced cheeks, said cheeks and said second chain element having alignable perforations to accept a pintle, a generally cylindrical pintle having a longitudinal flat with a longitudinally extending portion higher than but of lesser width than said flat and extending substantially the full length of the pintle, one at least of the perforations in said cheeks having a flat coacting with the flat of said pintle to prevent rotation of said pintle with respect to said cheek, the said perforation in said cheek being further configured to pass said raised portion of said pintle, the said raised portion of said pintle being relieved laterally at its end adjacent said cheek to provide an opening through which a locking pin may be driven, and a locking pin drivable through said opening, the leading end of said pin being deflectable by the inner end of said relief to a position behind a portion of said cheek.

8. The structure claimed in claim 7 wherein the inner surface of said cheek is countersunk to accept the deflected end of said pin.

9. In a structure of the class described, a chain element having spaced cheeks, a second chain element having a portion to be positioned between said spaced cheeks, said cheeks and said second chain element having alignable perforations to accept a pintle, a generally cylindrical pintle for pivoting said elements together, said pintle having a longitudinally extending, substantially V-shaped groove with angularly related walls, one of said walls lying in a substantially radial plane and the other in a chordal plane of said pintle, the perforation in at least one of said cheeks being shaped to conform to the surface of said pintle including said groove whereby said pintle is locked against rotation with respect to said cheek, the end of said radial wall adjacent said cheek having a relief whereby an opening is provided through which a locking pin may be driven, and a locking pin drivable through said opening and deflectable by the end of said relief to a position behind the end of said cheek.

10. The structure claimed in claim 9 wherein the inner surface of said cheek is relieved to accept the deflected end of said pin.

References Cited in the file of this patent
UNITED STATES PATENTS
2,802,369    McPhee _____ Aug. 13, 1957